No. 683,091. Patented Sept. 24, 1901.
C. W. WINTHER.
MILK DISPENSING MACHINE.
(Application filed Apr. 13, 1901.)
(No Model.) 8 Sheets—Sheet 1.

Witnesses.
Anne S. Read
Harry Kilgore

Inventor.
Christian W. Winther.
By his Attorneys.
Williamson Merchant

No. 683,091. Patented Sept. 24, 1901.
C. W. WINTHER.
MILK DISPENSING MACHINE.
(Application filed Apr. 13, 1901.)

(No Model.) 8 Sheets—Sheet 2.

Witnesses.
Anne S. Read
Harry Kilgore

Inventor.
Christian W. Winther.
By his Attorneys,
Williamson & Merchant

No. 683,091. Patented Sept. 24, 1901.
C. W. WINTHER.
MILK DISPENSING MACHINE.
(Application filed Apr. 13, 1901.)
(No Model.) 8 Sheets—Sheet 4.

Fig. 6.

Witnesses.
Inventor
Christian W. Winther.
By his Attorneys.

No. 683,091. Patented Sept. 24, 1901.
C. W. WINTHER.
MILK DISPENSING MACHINE.
(Application filed Apr. 13, 1901.)
(No Model.) 8 Sheets—Sheet 5.

Witnesses.
Anne S. Read
Harry Kilgore

Inventor.
Christian W. Winther
By his Attorneys.
Williamson Merchant

No. 683,091. Patented Sept. 24, 1901.
C. W. WINTHER.
MILK DISPENSING MACHINE.
(Application filed Apr. 13, 1901.)

(No Model.) 8 Sheets—Sheet 7.

Fig. 9.

Witnesses.
Anne S. Read
Harry Kilgore

Inventor.
Christian W. Winther
By his Attorneys
Williamson & Merchant

No. 683,091. Patented Sept. 24, 1901.
C. W. WINTHER.
MILK DISPENSING MACHINE.
(Application filed Apr. 13, 1901.)

(No Model.) 8 Sheets—Sheet 8.

Witnesses.
Inie S. Read
Harry Kilgore

Inventor.
Christian W. Winther.
By his Attorneys.
Williamson & Merchant

UNITED STATES PATENT OFFICE.

CHRISTIAN W. WINTHER, OF MINER, SOUTH DAKOTA.

MILK-DISPENSING MACHINE.

SPECIFICATION forming part of Letters Patent No. 683,091, dated September 24, 1901.

Application filed April 13, 1901. Serial No. 55,635. (No model.)

*To all whom it may concern:*

Be it known that I, CHRISTIAN W. WINTHER, a citizen of the United States, residing at Miner, in the county of Miner and State of South Dakota, have invented certain new and useful Improvements in Milk-Dispensing Machines; and I do hereby declare the following to be a full, clear, and exact description of the invention, such as will enable others skilled in the art to which it appertains to make and use the same.

My invention relates to devices for dispensing and delivering liquids in measured quantities, and is especially designed for use in connection with creameries to deliver in proper quantities the skimmed milk to which the farmers or other customers are entitled.

To the above ends the invention consists of the novel devices and combinations of devices hereinafter described, and defined in the claims.

The invention is illustrated in the accompanying drawings, wherein like characters indicate like parts throughout the several views.

Figure 1:
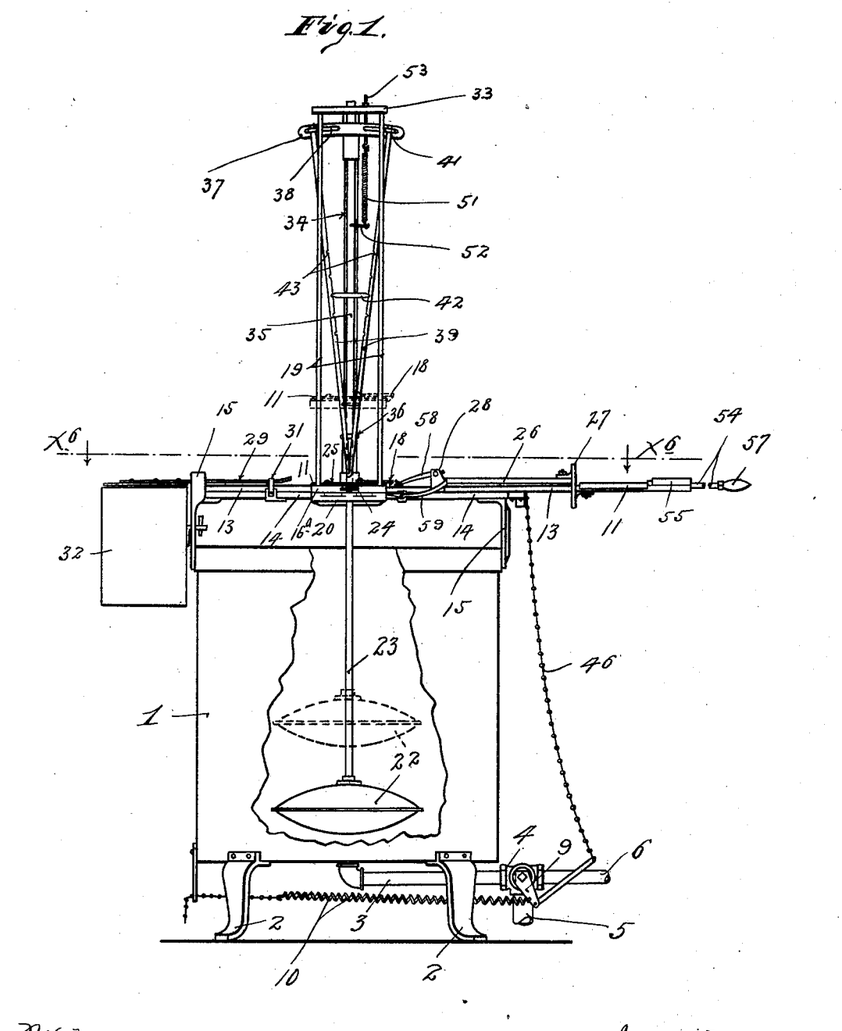
Figure 1 is a view in front elevation with some parts broken away, showing a dispensing apparatus constructed in accordance with my invention.
Figures 2, 3:
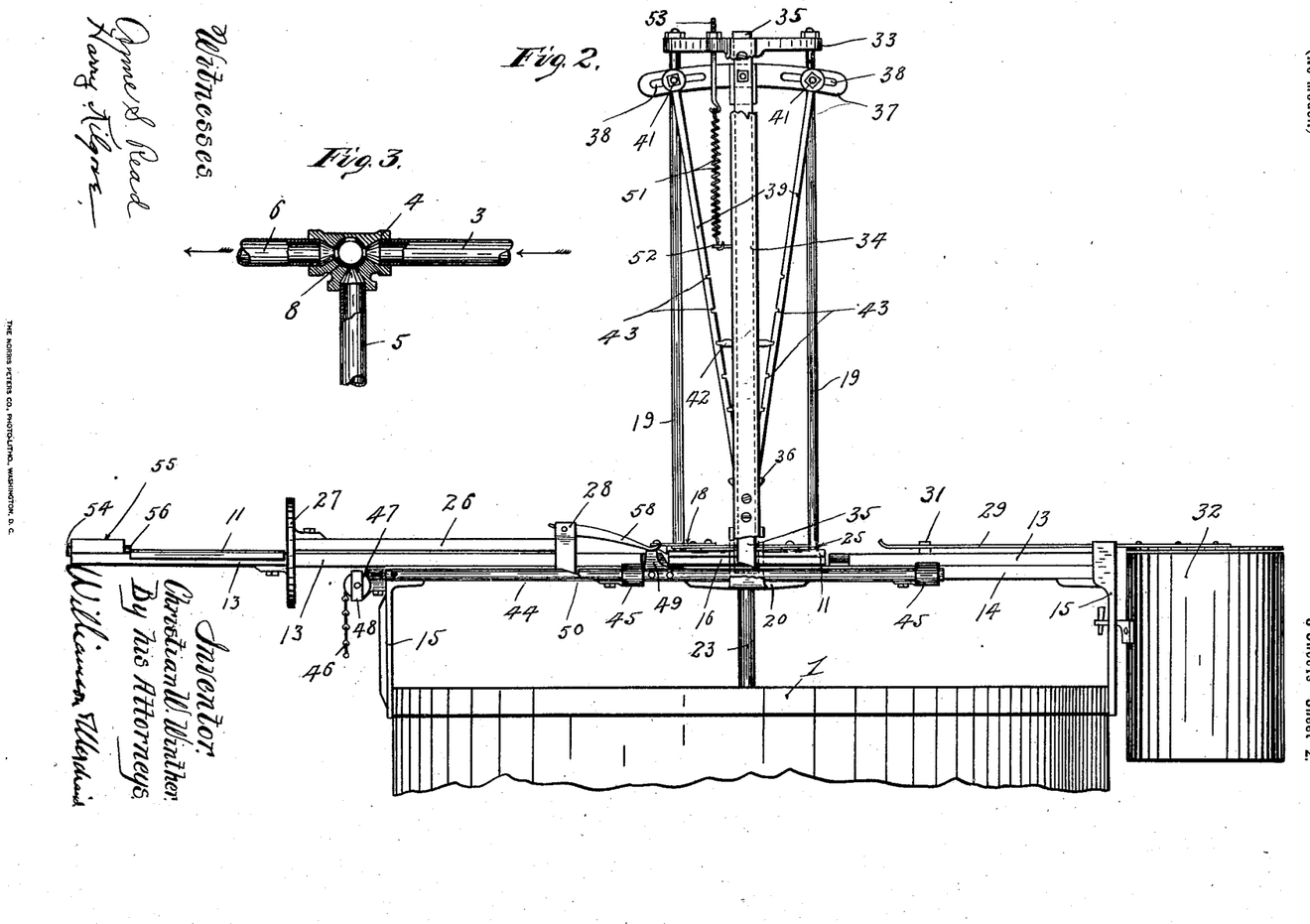
Fig. 2 is an enlarged view, in rear elevation, showing the upper portion of the apparatus.
Fig. 3 is a detail view, partly in side elevation and partly in section, showing the distribution-valve in its normal position, in which position it stands when the other parts are in the positions indicated in Fig. 2.
Figures 4, 5:
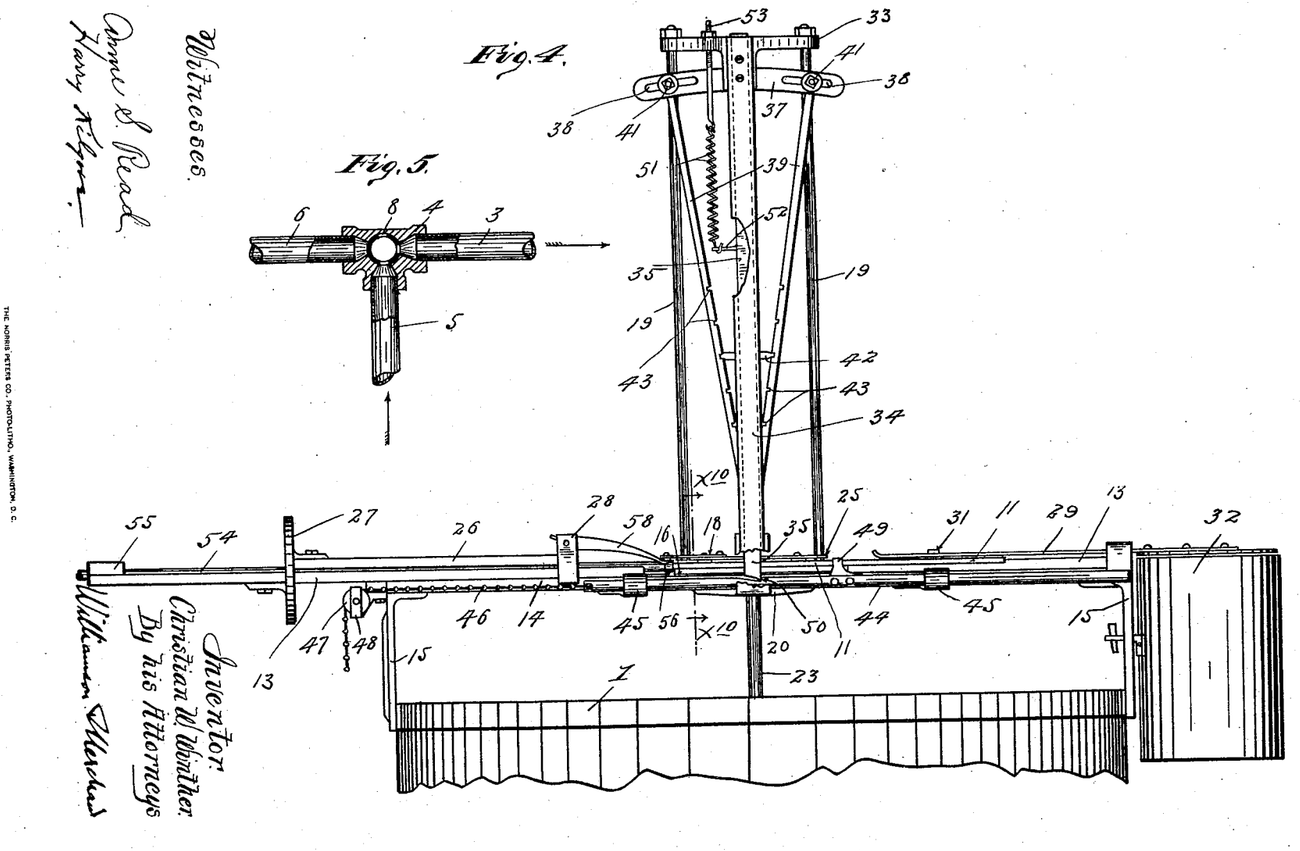
Fig. 4 is a view corresponding to Fig. 2, but showing the parts in the positions in which they will stand when the distribution-valve is set and locked.
Fig. 5 is a view corresponding to Fig. 3, but showing the distribution-valve in its so-called "set" position.
Figure 6:
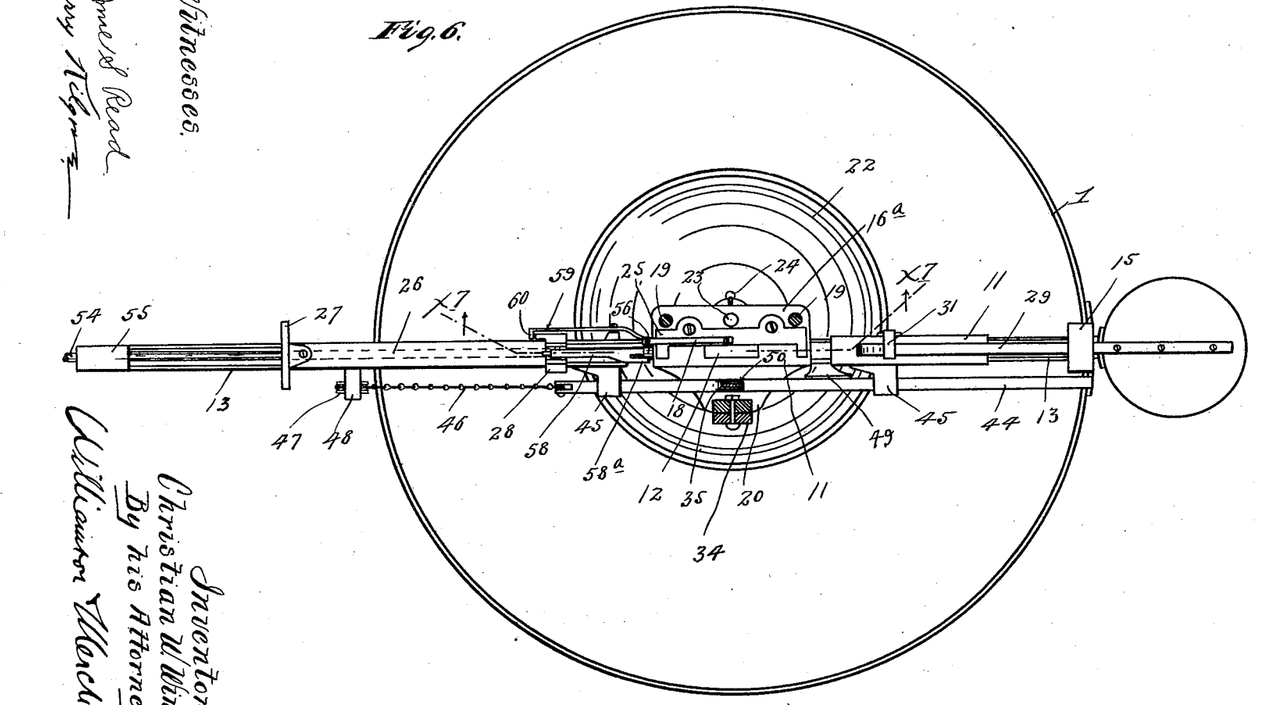
Fig. 6 is a horizontal section on the line $x^6 x^6$ of Fig. 1.

The skim-milk or other liquid is measured in a tank 1, which, as shown, is of cylindrical form and is supported by legs 2. A pipe 3 opens into the bottom of the tank 1, and to the outer end of this pipe is secured a valve-casing 4, into which open a supply-pipe 5 and a discharge-pipe 6. Mounted within the valve-casing 4 is a three-way distribution-valve 8, which normally stands, as indicated in Fig. 3, so that any liquid within the measuring-tank 1 is free to run out through the discharge-pipe 6 when the supply from the pipe 5 is cut off. The said valve 8 has an arm 9, which is subject to a spring 10, that yieldingly holds the same in its normal position. (Indicated in Fig. 3.)

Figure 7:
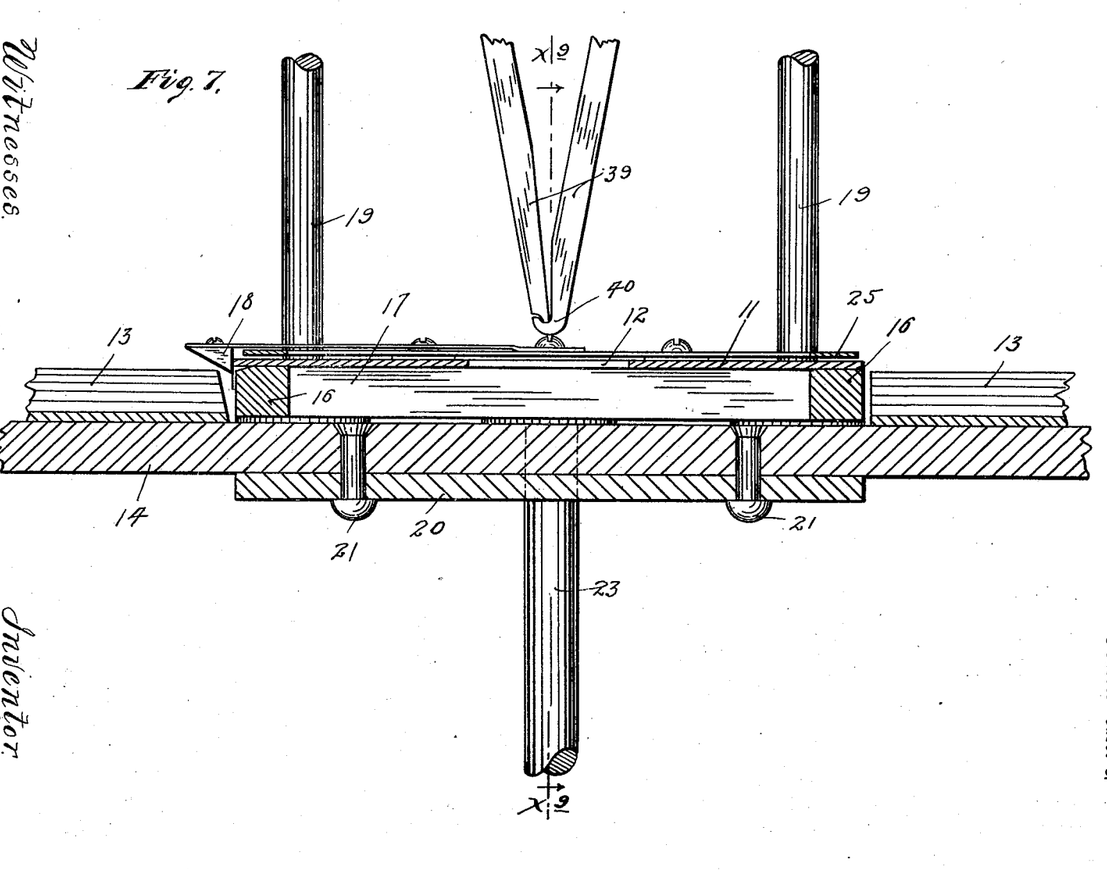
Fig. 7 is a detail view, on an enlarged scale, taken in section approximately on the line $x^7 x^7$ of Fig. 6.
Figure 9:
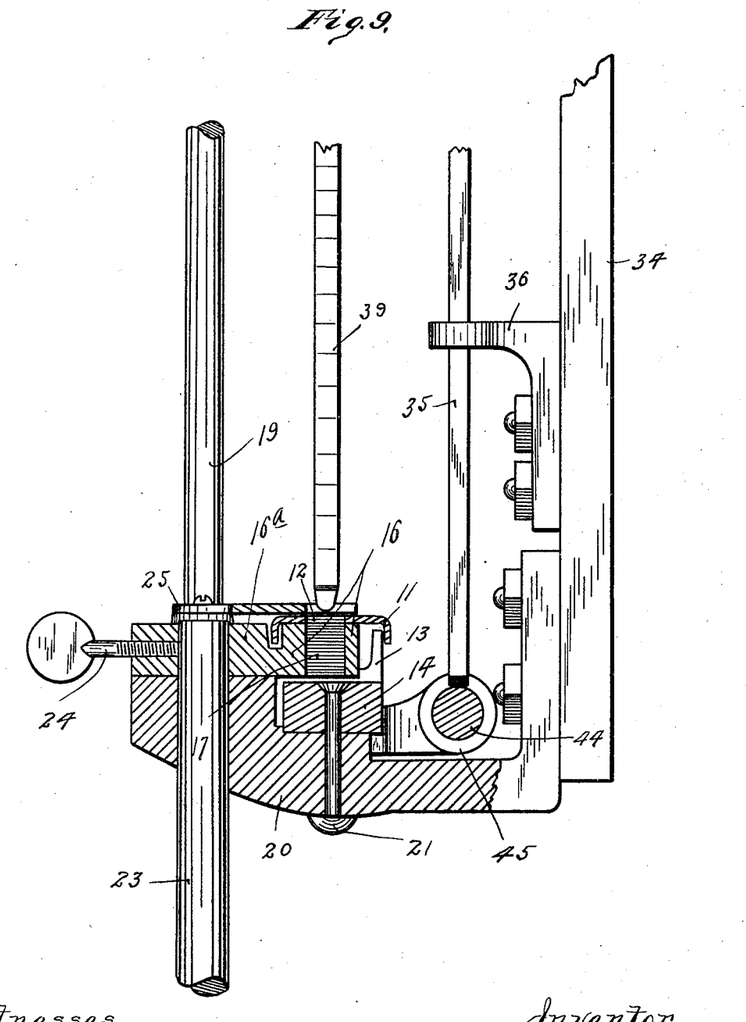
Fig. 9 is a detail view taken approximately on the line $x^9 x^9$ of Fig. 7.
Figure 10:
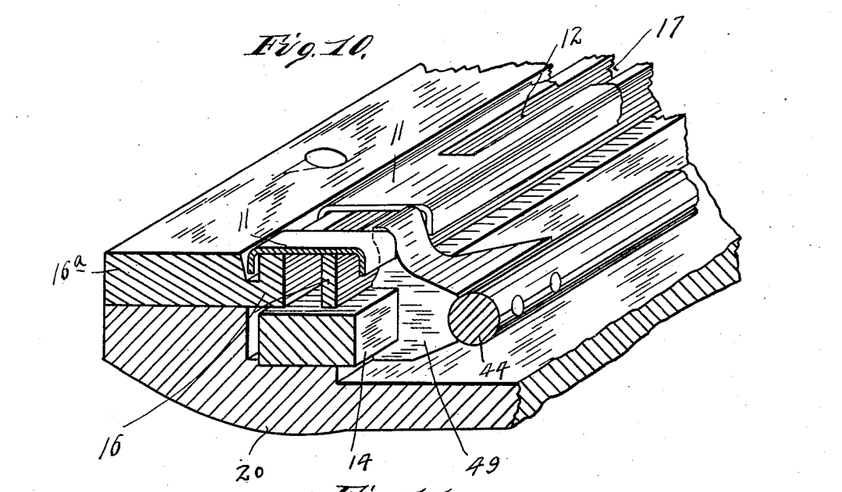
Fig. 10 is a detail view, partly in perspective and partly in section, the section thereof being taken approximately on the line $x^{10} x^{10}$ of Fig. 4.
Figure 11:
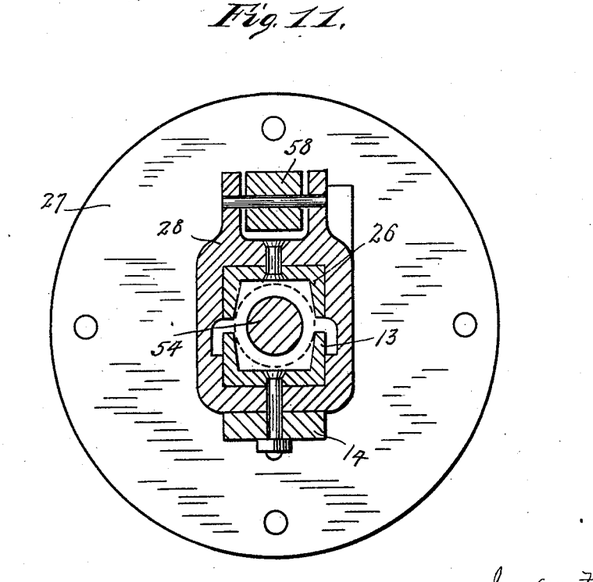
Fig. 11 is a vertical section on the line $x^{11} x^{11}$ of Fig. 8, some parts being removed.

It may be here stated that the quantity of milk or liquid which is dispensed under one complete operation is controlled by a so-called "quantity-check," which is preferably formed by a channel-shaped piece of iron 11, provided with a central perforation 12, as best shown in Figs. 7, 9, and 10. The slots 12 of said quantity-checks are made of various lengths, according to the amount of milk or liquid which it is intended shall be dispensed under the action thereof. For instance, a check which would entitle the customer to ten gallons of skim-milk would have its slot 12 twice as long as the slot of a check which would entitle the customer to five gallons.

The quantity-checks 11 are adapted to be passed over a suitable guide afforded by a channel-shaped bar or rod 13, which is rigidly secured to an under bar 14, which in turn is supported from the tank 1 by brackets 15. At its central portion (see particularly Fig. 7) the guide-bar 13 is cut away, and therein is fitted or interposed a supplemental guide-section 16, herein termed the "anvil." The anvil-section 16 is slotted at 17 for a purpose which will presently appear, and, as will be noted in said Fig. 7, the said anvil and the check 11 positioned thereon are of approximately the same length. A cam-headed spring-detent 18 on the said anvil holds the said quantity-check 11 from return movement or movement toward the left with respect to said view. The said anvil 16 is vertically movable, and to this end it is provided at one side with a projecting flange 16ª, which works loosely on vertical guide-rods 19, supported at their lower ends by a bracket 20, (see Figs. 7, 8, 9, and 10,) which bracket 20 is shown as secured by rivets 21 to the guide-supporting bar 14.

Working within the measuring-tank 1 is a float, preferably in the form of an air-bulb 22, provided with a vertically-projecting stem 23, which works vertically through the bracket 20 and the upper end of which is adjustably secured by a set-screw 24 to the flange 16ª of the anvil 16. When the quantity-check 11 is positioned on the anvil 16, it underlies the projecting rings of a retaining-plate 25, which prevents the said check from being raised from its seat on the anvil. This retaining-plate is best shown in Figs. 7 and 9, but the same is removed from Fig. 10.

As shown in the drawings, (see particularly Figs. 1, 2, 4, and 11,) a channel-shaped cover 26 overlies a portion of the outer section of the guide-bar 13, the same being secured to the bar 14 by brackets 27 and 28. Also a retaining-strip 29 overlies the inner section of said guide-rod 13, the same, as shown, being secured to said bar 14 by a small bracket 31 and by a projection of one of the brackets 15, heretofore noted. To this bracket 15 a check-receiving box or receptacle 32 is shown as secured.

To the upper ends of the guide-rods 19 a bracket 33 is rigidly secured, and this bracket in turn is rigidly connected at its rearward side by a vertical bar 34 to an upturned rear portion of the previously-noted bracket 20, as best shown in Figs. 2, 4, 6, and 9. A lock-bar 35 is mounted to slide vertically through the bracket 33 and through a guide 36 on the bar 34, as best shown in Figs. 1, 2, 4, and 9. Near its upper end, but below the bracket 33, the lock-bar 35 is provided with a head 37, in the projecting ends of which are segmental slots 38.

The so-called "lock-tripping wedge" is formed by a pair of upwardly-converging rods 39, the lower ends of which are pivotally connected or fulcrumed, preferably, as best shown in Fig. 7 at 40. The upper ends of the said rods 39 are adjustably secured by nutted bolts 41 to the slotted ends 38 of the lock-bar head 37. The apex of the wedge formed at 41 stands directly over the slot 12 of the quantity-check 11, which is positioned on the anvil 16 so that when the said anvil is raised the depending end of said wedge will enter the slot of the said check. To stiffen the rods 39 of the lock-tripping wedge, a small strut 42 is adjustably secured in notches 43 of said rods.

A lock-bolt or plunger 44 is mounted to work loosely in guide-lugs 45, projecting from the supporting-bar 14. The rear end is connected by a chain or flexible connection 46 to the free end of the arm 9 of the three-way distribution-valve 8. As shown, the said chain 46 runs over a guide-sheave 47, mounted in a suitable bracket 48, secured to the adjacent bracket 15. The lock-bolt or plunger 44 is provided with a lug 49, which is adapted to be engaged by one edge of the quantity-check 11 as the latter is moved onto the anvil or vertically-movable guide-section 16. Said lock-bolt or plunger 44 has also a notch or shoulder 50, which when moved into the position indicated in Fig. 4 (in which position it will be remembered the distribution-valve 8 is moved into its set position, indicated in Fig. 5) will be engaged and said bolt locked by the depending end of the lock-bar 35, as shown in said Fig. 4. The weight of the lock-bar 35, head 37, and wedge-rods 39 is partially taken up by a spring 51, one end of which is, as shown, connected to a pin 52 on said bar 35 and to a nutted adjusting-bolt 53, which works through the fixed bracket 33. The spring 51 should be so adjusted that but very little force would be required to raise the said wedge 39 and lock-bar 35.

Figure 8:
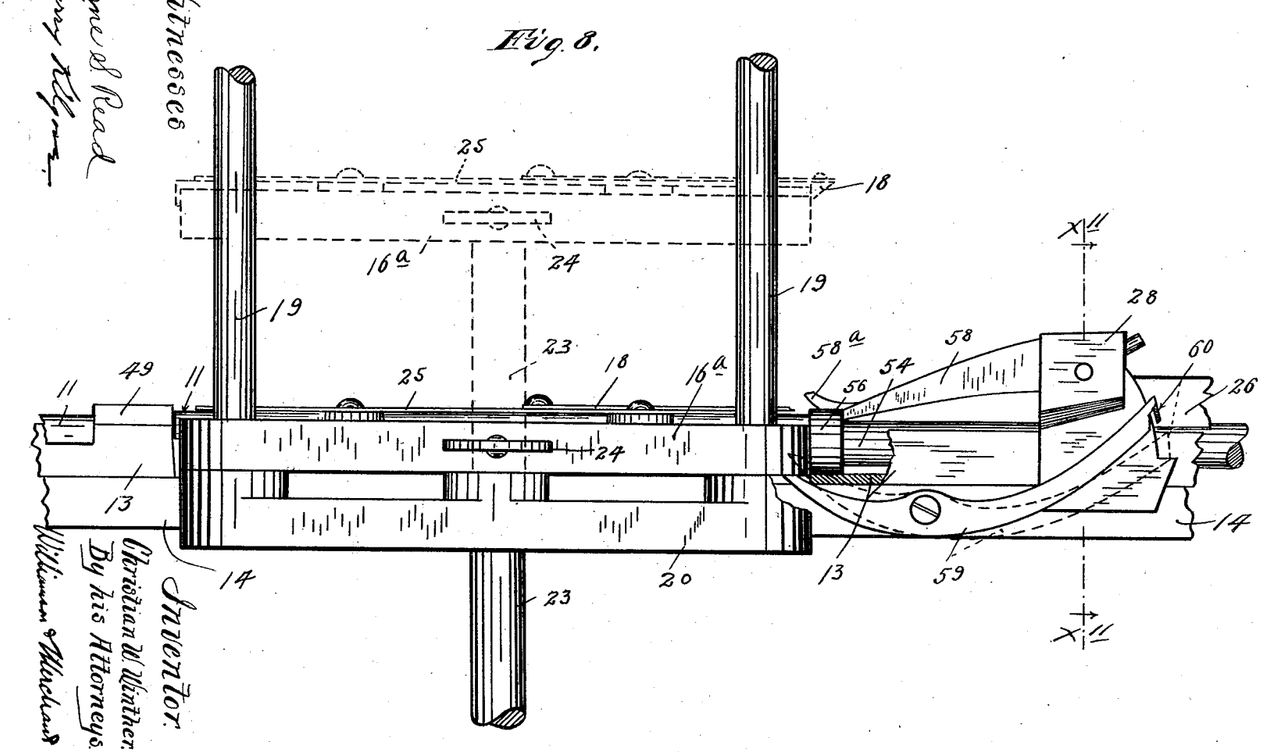
Fig. 8 is a detail view, in rear elevation, showing substantially the same parts illustrated in Fig. 7.

The quantity-checks are adapted to be first placed on the outer end of the guide-bar 13, as illustrated in Fig. 2, and they are adapted to be forced onto the anvil 16 by means of a driving-plunger 54, which works through a suitable keeper 55 on the outer end of said bar 13 and is provided at its inner end with a head 56 and at its outer end with a hand-piece 57. When the quantity-check is by this plunger 54 forced completely onto the anvil 16, it is by the spring-detent 18, already noted, held against return movement, and the said plunger itself is for the time being locked against return movement by a lock-pawl 58, which is pivoted to the bracket 28 and engages the head 56 of said driving-plunger, as best shown in Fig. 8. Normally the lug 49 on the lock-bolt 44 underlies the curved and laterally-offset cam portion 58ª of the lock-pawl 58 and holds said pawl in inoperative position, as shown in Fig. 2—that is, with its free end above the head 56 of the driving-plunger 54. When the quantity-check is, as already described, forced onto the anvil 16, it engages the lug 49 of the lock-bolt 44 and moves the same into the position indicated in Fig. 4, in which position, as already indicated, the said lock-bolt is locked by the engagement of the depending end of the lock-bar 35 with the notch or shoulder 50 of said bolt 44. In the position of the parts indicated in Figs. 4 and 5 the skim-milk will run through the pipes 5 and 3 into the measuring-tank 1. The float will of course be raised under the action of the inflow of milk or liquid, and the float of course carries with it or raises the anvil 16 and the positioned quantity-check 11. When the slot 12 of the said quantity-check reaches a point where it engages the sides of the wedge-rods 39, the said wedge and the lock-bar 35 will be raised, thereby releasing the lock-bolt 44 and permitting the same and the distribution-valve 8 to be quickly thrown back to their normal positions under the action of the spring 10.

When the said distribution-valve is in its normal position, the milk is free to run from the measuring-tank out through the pipes 3 and 6 to a point where it is received by the customer. Also it will be noted that the return movement of the lock-bolt 44 while the quantity-check is raised causes its lug 49 to raise the lock-pawl 58 and release the guiding-plunger 54. Thus it will be understood the so-called "lock-pawl" 58 serves to prevent a second check from being forced onto the anvil or the one already positioned thereon to be removed before the properly-positioned quantity-check has been raised. To prevent a second quantity-check from being forced into the machine or as far as the anvil while the said anvil is raised, I provide a so-called "cut-off dog," which may take various forms, but is preferably in the form of a lever 59, pivoted to one side of the supporting-bar 14 and provided at its outer end with a transversely-projecting stop-flange 60, which is movable into and out of the path of the adjacent flange of the quantity-check. When the anvil 16 is in its normal or lowered position, as indicated in Fig. 8 by full lines, the inner end of the cut-off dog 59 is pressed downward thereby and the stop-flange 60 is raised into inoperative position. When, however, the said anvil is raised, the said dog 59 falls by gravity into the position indicated by dotted lines in Fig. 8, in which position the said stop-flange 60 will engage a quantity-check, which may be forced against it.

The relative dimensions of the slots in the various quantity-checks will remain the same regardless of the proportionate amount of skim-milk which is dealt out with respect to the amount of milk brought to the creamery by the customer. For instance, at one creamery seventy per cent. of skim-milk may be returned to the customer. Seventy-five or eighty or even eighty-five per cent. may be returned. The above variation in the divergency of the trip-wedge makes it possible without changing the dimensions of the slots 12 of the quantity-checks to give any per cent. desired. In practice the notches 43 in the wedge-bars 39 are so located and the strut 32 is of such length that the wedge may be set for a given per cent. marked thereon or otherwise indicated. It will therefore be understood that the adjustment of the so-called trip-wedge is a very important feature.

It sometimes happens in running the apparatus that foam or froth will accumulate in considerable quantity within the measuring-tank. This foam will not readily run from the measuring-tank, and, as the float will rise to the top or approximately to the top of the same, it is evident that it will prevent the anvil or movable guide-section 16 from falling back to its normal position when the tank has been drained of all of the skim-milk except the foam. When this happens, the set-screw 24, which connects the anvil to the float-stem 23, is loosened and the said anvil is permitted to move downward on the said stem until it reaches its normal position; when it is again secured to the said stem by the said set-screw. This being done, the device will work accurately until the foam has settled or worked its way out of the tank, when the parts should be again properly adjusted.

It will of course be understood that the device above described is capable of quite a large range of modification within the scope of my invention.

What I claim, and desire to secure by Letters Patent of the United States, is as follows:

1. The combination with a measuring-tank, of a three-way valve yieldingly held in a position for filling, and movable into a position for discharging from said receptacle, a sliding lock-bolt with connections to said valve, for setting the same in position for filling, a vertically-movable lock-bar for locking said lock-bolt, a trip-wedge movable with said lock-bar, a float in said receptacle, an anvil connected to the stem of said float, and adapted to receive the quantity-check and carry the same into action on said wedge, substantially as described.

2. The combination with a measuring-receptacle, of valve mechanism controlling the flow into and from the same, a lock for setting the said valve in a position for filling, a float within said receptacle provided with a projecting stem, an anvil adjustably secured on said stem for the purpose set forth, and adapted to receive the quantity-check, and a trip for said lock involving a wedge which is subject to the quantity-check, substantially as described.

3. The combination with a measuring-receptacle, of valve mechanism therefor yieldingly held in a position for discharging, a lock for holding said valve mechanism in a position to fill said receptacle, and means for tripping said lock under the action of the quantity-check, comprising a float, an anvil, or check-holder, a wedge, and means for adjusting said wedge to vary the degrees of its divergence, substantially as described.

4. The combination with a measuring-receptacle, of valve mechanism yieldingly held in a position for discharging, a lock for holding said valve mechanism in a position for filling, a float in said receptacle provided with a vertical stem, an anvil secured to said float-stem, and a trip for said lock involving a wedge made up of a pair of bars pivoted or fulcrumed at the apex of the wedge and adjustable at the base thereof, substantially as described.

5. The combination with a measuring-receptacle, of valve mechanism yieldingly held in a position for discharging, a lock, connections for setting and securing said valve mechanism in a position for filling, a guide for the quantity-check involving a vertically-movable anvil, a float in said receptacle having a stem which acts upon said anvil to raise the same, a driving-plunger for forcing the quantity-checks onto said anvil, and for moving said lock to set said valve in position to fill it, and a trip for said lock involving a wedge which is subject to the quantity-check which is raised by the anvil, substantially as described.

6. The combination with a measuring-tank and a float therein provided with a vertical stem, a valve mechanism yieldingly held in a position for discharging from said receptacle, a guide for the quantity-checks involving a vertically-movable anvil or section connected to said float-stem, a driving-plunger for delivering the quantity-checks over said guide and to said anvil, a vertically-movable lock-bar, a lock-bolt connected to the said valve mechanism and provided with a part which is subject to the quantity-check which is moved onto said anvil, which lock-bolt is moved by said quantity-check into a position where it is locked by said lock-bar, and a trip for said lock involving a wedge which is subject to the raised quantity-check, substantially as described.

7. The combination with a measuring-receptacle, of valve mechanism yieldingly held in a position to fill said receptacle, a lock for holding said valve mechanism in a position for discharging, a guide for the quantity-checks involving a vertically-movable anvil, a float in said receptacle having a stem to which said anvil is connected, a trip for said lock involving a wedge subject to the raised quantity-check, a check-feeding plunger for feeding the quantity-checks to the said anvil, a pawl or detent for locking said plunger and releasing the same when the said lock is released, and a cut-off stop serving to prevent the feeding of checks while the said anvil is raised, substantially as described.

In testimony whereof I affix my signature in presence of two witnesses.

CHRISTIAN W. WINTHER.

Witnesses:
ELVA NEELY,
BEN H. MILLARD.